(12) United States Patent
Lee

(10) Patent No.: US 12,065,837 B2
(45) Date of Patent: Aug. 20, 2024

(54) EXTERIOR BUILDING STRUCTURE USING UNIT INTEGRATED WITH INSULATION

(71) Applicant: Sunpark Co., Incheon (KR)

(72) Inventor: Yun Kyu Lee, Incheon (KR)

(73) Assignee: Sunpark Co., Incheon (KR)

( * ) Notice: Subject to any disclaimer, the term of this patent is extended or adjusted under 35 U.S.C. 154(b) by 118 days.

(21) Appl. No.: 17/938,759

(22) Filed: Oct. 7, 2022

(65) Prior Publication Data

US 2023/0407644 A1 Dec. 21, 2023

(30) Foreign Application Priority Data

Jun. 18, 2022 (KR) .................. 10-2022-0074477

(51) Int. Cl.
*E04F 13/08* (2006.01)
(52) U.S. Cl.
CPC ........ *E04F 13/0875* (2013.01); *E04F 13/083* (2013.01)
(58) Field of Classification Search
None
See application file for complete search history.

(56) References Cited

U.S. PATENT DOCUMENTS

| 2022/0290442 | A1* | 9/2022 | Bilge | .................. | E04F 13/0807 |
| 2023/0407644 | A1* | 12/2023 | Lee | ...................... | E04F 13/007 |

FOREIGN PATENT DOCUMENTS

| KR | 10-1334320 B1 | 11/2013 |
| KR | 10-1664359 B1 | 10/2016 |
| KR | 102346075 B1 * | 12/2021 |
| KR | 10-2022-0037689 A | 3/2022 |

\* cited by examiner

*Primary Examiner* — Joshua K Ihezie
(74) *Attorney, Agent, or Firm* — Studebaker & Brackett PC

(57) ABSTRACT

An exterior building structure using a unit integrated with insulation is proposed. The exterior building structure, which fixes an insulation-integrated unit to an outer wall of a building, includes a plurality of insulation-integrated units including a frame, a functional member fixed to the frame, and an insulation member, the plurality of insulation-integrated units being sequentially arranged vertically and horizontally, and a plurality of horizontal insulation units each including a hollow horizontal frame and a horizontal insulation member provided inside the horizontal frame, formed into a horizontally long shape to block heat transfer moving via a gap between the insulation-integrated units that are vertically adjacent to each other, and supporting an upper end of a lower insulation-integrated unit and a lower end of an upper insulation-integrated unit of the two vertically adjacent insulation-integrated units while being fixed to the outer wall to be vertically spaced apart from another horizontal insulation unit.

17 Claims, 2 Drawing Sheets

EXTERIOR BUILDING STRUCTURE USING UNIT INTEGRATED WITH INSULATION

CROSS REFERENCE TO RELATED APPLICATION

The present application claims priority to Korean Patent Application No. 10-2022-0074477, filed Jun. 18, 2022, the entire contents of which is incorporated herein for all purposes by this reference.

BACKGROUND OF THE INVENTION

Field of the Invention

The present disclosure relates generally to an exterior building structure using a unit integrated with insulation.

Description of the Related Art

A building exterior material is used to improve the exterior function or aesthetics of a building, and insulation is arranged between an outer wall and the exterior material of the building. In general, after the insulation is installed on the outer wall of the building, the exterior material is installed on an outside portion of the insulation. Therefore, conventionally, as the exterior material and the insulation are separately installed, there are disadvantages that constructions of the insulation and the exterior material are cumbersome and the construction period thereof is longer.

Documents of Related Art

Korean Patent No. 1664359 (Title: Terra-cotta tile fixing device for buildings)
Korean Patent No. 1334320 (Title: Device for fixing terracotta panel on building)
Korean Patent Application Publication No. 2022-0037689 (Title: Structure of supporting exterior material for construction)

SUMMARY OF THE INVENTION

The present disclosure has been made keeping in mind the above problems occurring in the related art, and the present disclosure is intended to provide an exterior building structure using a unit integrated with insulation, the exterior building structure being configured to allow simple construction to be performed.

According to one aspect of the present disclosure, there is provided an exterior building structure using a unit integrated insulation, the exterior building structure fixing an insulation-integrated unit to an outer wall of a building, the exterior building structure using a unit integrated insulation including: a plurality of insulation-integrated units each including a frame, a functional member fixed to the frame, and an insulation member, the plurality of insulation-integrated units being sequentially arranged vertically and horizontally; and a plurality of horizontal insulation units each including a hollow horizontal frame and a horizontal insulation member provided inside the horizontal frame, formed into a horizontally long shape to block heat transfer moving via a gap between the insulation-integrated units that are vertically adjacent to each other, and supporting an upper end of a lower insulation-integrated unit and a lower end of an upper insulation-integrated unit of the two vertically adjacent insulation-integrated units while being fixed to the outer wall to be vertically spaced apart from another horizontal insulation unit.

In the embodiment of the present disclosure, the functional member may be fixed to a front end of the frame and be exposed to an outside space, and the insulation member mat be fixed to a rear end of the frame and be spaced apart from the functional member front and rear.

In the embodiment of the present disclosure, an inlet and an outlet may be respectively formed on a lower surface and an upper surface of the frame so that air may be introduced into an inside space and discharged to an outside space of the frame via the inlet and the outlet, and a flow path may be defined inside the frame, and the air introduced into the inside space and discharged to the outside space of the frame via the inlet and the outlet may flow along the flow path.

In the embodiment of the present disclosure, each of the insulation-integrated units further may include a blocking member fixed to an inside portion of the frame, the inside portion corresponding to a gap between the functional member and the insulation member, and the blocking member may block the insulation member from being in contact with the air flowing along the flow path.

In the embodiment of the present disclosure, the flow path may be defined between a rear surface of the functional member and a front surface of the blocking member, and the blocking member may be arranged such that a flow sectional area of the flow path may be reduced from the inlet toward the outlet.

In the embodiment of the present disclosure, the frame may include: an upper frame defining appearances of an upper surface and a part of an upper portion of a rear surface of the frame, and supporting an upper end of the functional member and an upper end of the insulation member; a lower frame defining appearances of a lower surface and a part of a lower portion of the rear surface of the frame, and supporting a lower end of the functional member and a lower end of the insulation member; and an intermediate frame defining a remaining appearance of the rear surface of the frame, and connecting the upper frame to the lower frame, wherein a height of the frame may be variable in response to height of the intermediate frame.

In the embodiment of the present disclosure, the frame may include: a first locking hook arranged at an upper portion of a rear surface of the frame, and open downward; and a second locking hook arranged at a lower portion of the rear surface of the frame, and open downward, and the horizontal frame may include: a first locking groove provided at a lower portion of the horizontal frame and open forward, and into which the first locking hook of the lower insulation-integrated unit of the two vertically adjacent insulation-integrated units may be hooked; and a second locking groove provided at an upper portion of the horizontal frame and open toward at least an upper space, and into which the second locking hook of the upper insulation-integrated unit of the two vertically adjacent insulation-integrated units may be hooked, wherein each of the insulation-integrated unit may move in a front to rear direction so that the first locking hook may be inserted into the first locking groove and simultaneously the second locking hook may be located directly above the second locking groove, and then the insulation-integrated unit may move in an top to down direction so that the first and second locking hooks may be respectively hooked into the first locking groove of an upper horizontal insulation unit and the second locking groove of a lower horizontal insulation unit of two vertically adjacent horizontal insulation units of the horizontal insulation units.

In the embodiment of the present disclosure, the exterior building structure may further include a plurality of vertical insulation units each including a hollow vertical frame and a vertical insulation member provided inside the vertical frame, formed into a vertically long shape to block heat transfer moving via a gap between the insulation-integrated units that are horizontally adjacent to each other, and fixing the horizontal insulation units while being fixed to the outer wall to be horizontally spaced apart from another vertical insulation unit.

In the embodiment of the present disclosure, the horizontal frame may include: a first fastening flange extended downward from a rear end of a lower surface of the horizontal frame and through which a fastener fastened to the vertical frame may penetrate; a second fastening flange extended upward from a rear end of an upper surface of the horizontal frame and through which a fastener fastened to the vertical frame may penetrate; a first locking protrusion including a horizontal extension part extended forward from a lower end of the first fastening flange and a vertical extension part extended upward from a front end of the horizontal extension part, and with which the upper end of the lower insulation-integrated unit of the two vertically adjacent insulation-integrated units may be engaged; and a second locking protrusion extended upward from a front end of an upper surface of the horizontal frame and with which the lower end of the upper insulation-integrated unit of the two vertically adjacent insulation-integrated units may be engaged.

In the embodiment of the present disclosure, a first locking groove, into which the upper end of the lower insulation-integrated unit of the two vertically adjacent insulation-integrated units may be hooked, may be defined by a lower surface of the horizontal frame, a front surface of the first fastening flange, and an upper surface and a rear surface of the first locking protrusion, and a second locking groove, into which the lower end of the upper insulation-integrated unit of the two vertically adjacent insulation-integrated units may be hooked, may be defined by an upper surface of the horizontal frame, a front surface of the second fastening flange, and a rear surface of the second locking protrusion.

In the embodiment of the present disclosure, at least a part of the first fastening flange and a part of the second fastening flange may be exposed forward.

According to the embodiment of the present disclosure, the exterior building structure using a unit integrated with insulation can expect following effects.

First, in the embodiment of the present disclosure, the insulation member with the united shape in which the insulation member is integrated with the functional member is fixed to the outer wall of the building. Therefore, in the embodiment of the present disclosure, as the construction on side is minimized, simpler construction and reduction of construction period can be achieved.

Furthermore, in the embodiment of the present disclosure, the flow path is defined such that air flows efficiently into the inside space of the insulation-integrated unit. Therefore, according to the embodiment of the present disclosure, the operational reliability of variable types of functional members, specifically a member requiring cooling such as a solar panel, can be ensured.

In addition, in the embodiment of the present disclosure, the blocking member prevents moisture introduced via the flow path from being transferred to the insulation member. Therefore, according to the embodiment of the present disclosure, the insulation member can be prevented from being damaged.

Additionally, in the embodiment of the present disclosure, the horizontal and vertical insulation units block heat transfer moving via the gap between the adjacent insulation-integrated units. Therefore, according to the embodiment of the present disclosure, the overall thermal insulation performance can be improved.

In addition, in the embodiment of the present disclosure, the insulation member is not directly fixed to the outer wall, but the shape fixed to a separate frame, that is, the shape with the insulation-integrated unit, the horizontal insulation the unit, and the vertical insulation unit is fixed to the outer wall or to another unit. Therefore, according to the embodiment of the present disclosure, compared to a conventional construction in which a foam-type exterior material is directly fixed to the outer wall, solid fixation and supporting of the exterior material can be achieved.

DETAILED DESCRIPTION OF THE INVENTION

Hereinbelow, an exterior building structure using a unit integrated with insulation according to an embodiment of the present disclosure will be described in detail with reference to accompanying drawings.

Figure 1:
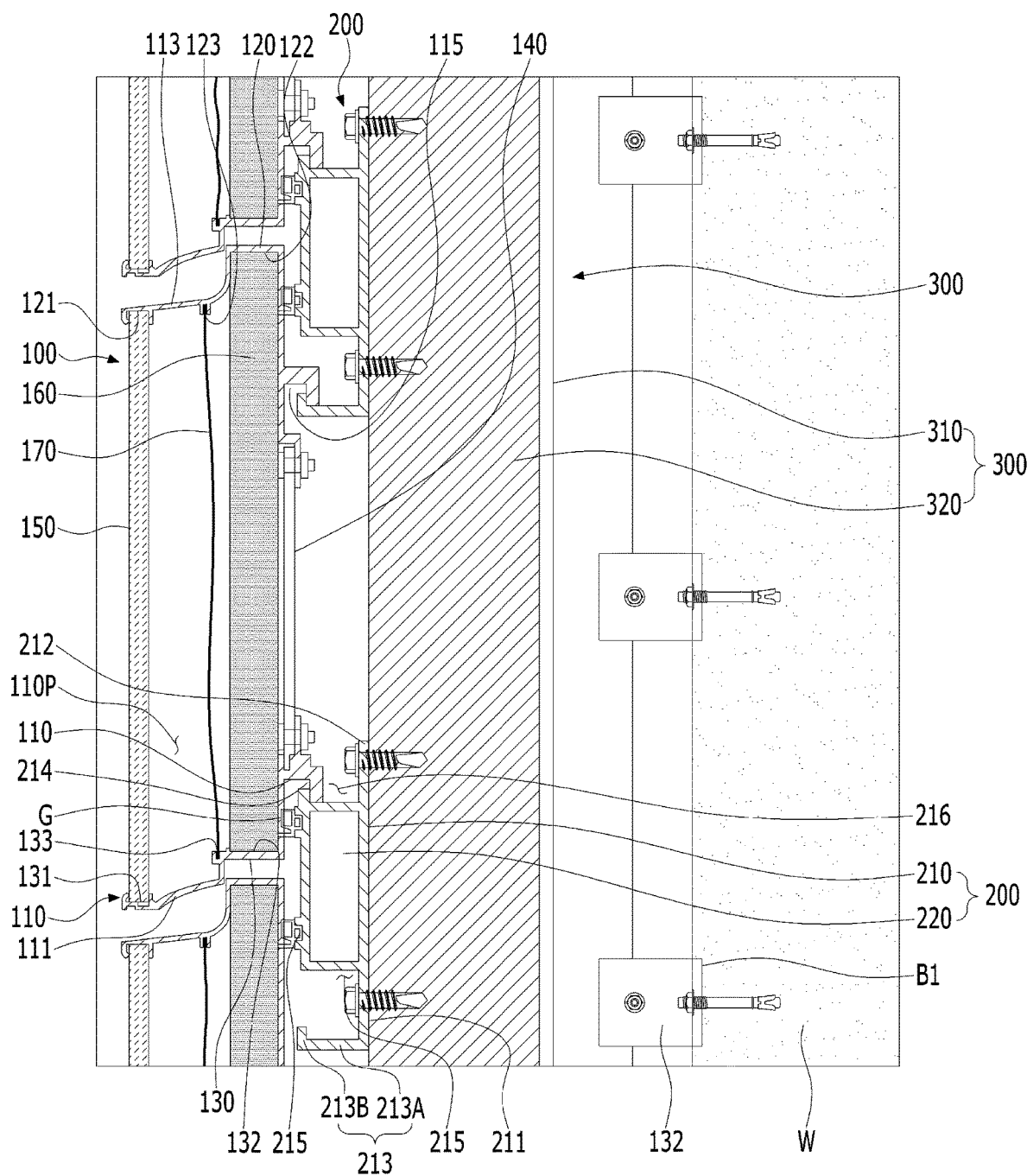
FIG. 1 is a longitudinally sectional view showing an exterior building structure using a unit integrated with insulation according to an embodiment of the present disclosure.
Figure 2:
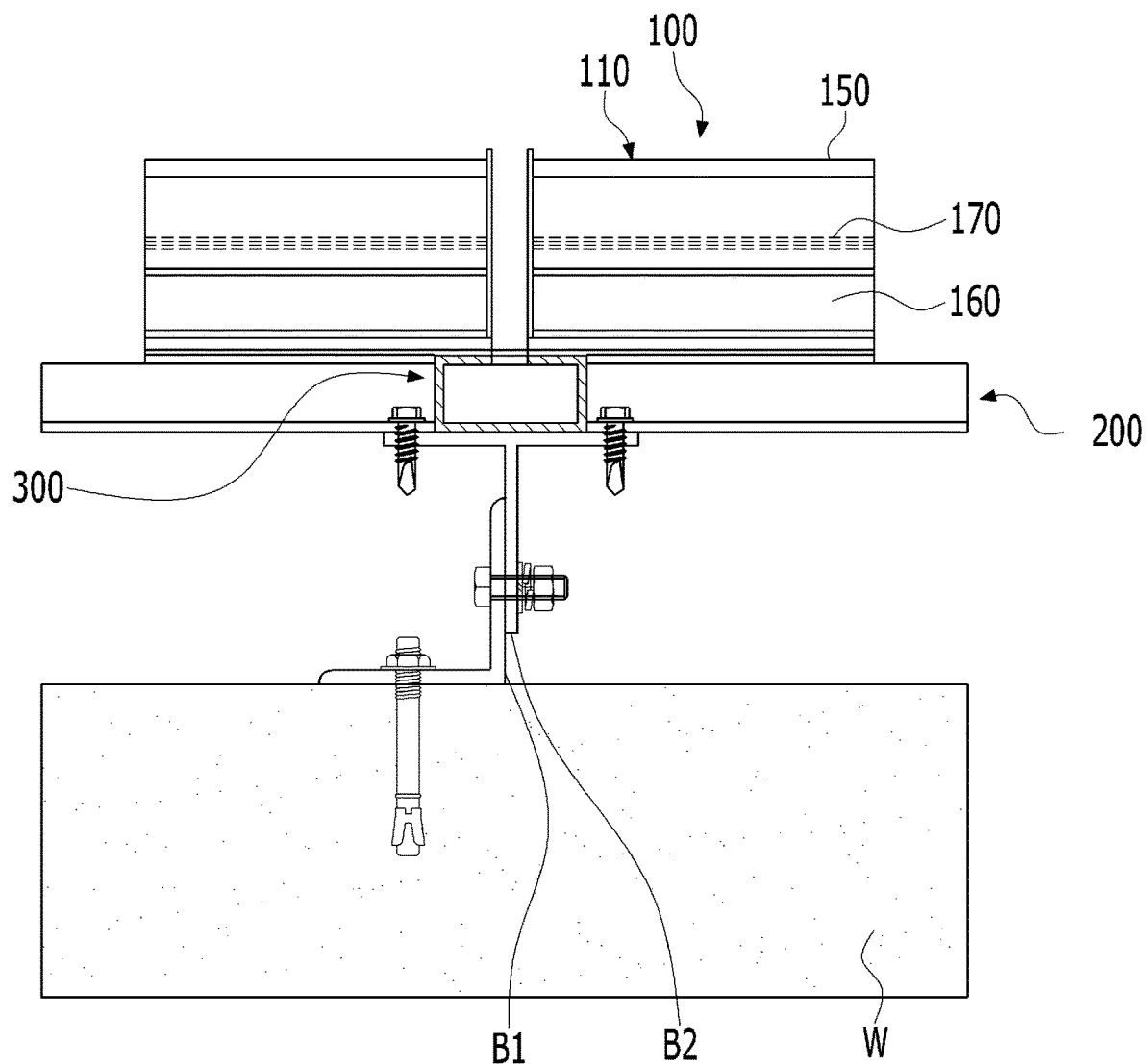
FIG. 2 is a transversally sectional view showing the embodiment of the present disclosure.

FIG. 1 is a longitudinally sectional view showing an exterior building structure using a unit integrated with insulation according to an embodiment of the present disclosure. FIG. 2 is a transversally sectional view showing the embodiment of the present disclosure.

Referring to FIGS. 1 and 2, according to the embodiment of the present disclosure, the exterior building structure 1 using a unit integrated with insulation is provided to fix an insulation-integrated unit 100 to an outer wall W of a building, and includes the insulation-integrated unit 100, a horizontal insulation unit 200, and a vertical insulation unit 300. The insulation-integrated unit 100 is supported by the horizontal insulation unit 200, and the horizontal insulation unit 200 is fixed to the vertical insulation unit 300 fixed to the outer wall W.

More specifically, the insulation-integrated unit 100 includes a plurality of insulation-integrated units 100, and the plurality of insulation-integrated units 100 is sequentially arranged vertically and horizontally so as to form entirely a grid shape. Each of the insulation-integrated unit 100 includes a frame 110, a functional member 150, an insulation member 160, and a blocking member 170.

The frame 110 is provided to fix the functional member 150 and the insulation member 160 thereto and, actually, the appearance of the insulation-integrated unit 100 is defined by the frame 110. For example, the frame 110 has a polyhedral shape with an open front surface.

An inlet 111 and an outlet 113 are formed in a lower surface and an upper surface of the frame 110. The inlet 111 and the outlet 113 are provided to introduce and discharge air into the inside space and to the outside space of the frame 110, and may be vertically arranged to face each other.

Furthermore, a flow path 100P is defined inside the frame 110. The flow path 100P is a part through which the air introduced and discharged into the inside space and to the outside space of the frame 110 through the inlet 111 and the outlet 113 flows. The flow path 100P is defined into a vertically long shape by a rear surface of the functional member 150 and a front surface of the blocking member 170.

The frame 110 includes first and second locking hooks 115 and 117. The first and second locking hooks 115 and 117 are provided to allow each of the insulation-integrated units 100 to be supported by the horizontal insulation units 200. The first locking hook 115 is arranged at an upper portion of a rear surface of the frame 110, and the second locking hook 117 is arranged at a lower portion of the rear surface of the frame 110. At this point, each of the first and second locking hooks 115 and 117 is open downward.

In the embodiment, the frame 110 may include a plurality of members, that is, an upper frame 120, a lower frame 130, and an intermediate frame 140. The upper frame 120 and the lower frame 130 define the appearances of the upper surface and a part of an upper portion and a part of a lower portion of the rear surface of the frame 110, and the intermediate frame 140 defines the appearance of a remaining portion of the rear surface of the frame 110. Therefore, the frame 110 has a polyhedral shape that is entirely open at the front surface. Of course, when the frame 110 includes separate side frames, side surfaces of the frame 110 may be shielded. In addition, the intermediate frame 140 connects a lower end of the upper frame 120 to an upper end of the lower frame 130, the upper frame 120 and the lower frame 130 defining the appearance of the rear surface of the frame 110. Therefore, in the embodiment, for example, as the height of the intermediate frame 140 is preset considering the height of the functional member 150 and/or the insulation member 160, the height of the frame 110 may be variable.

First to third upper fixing grooves 121, 122, and 123 and first to third lower fixing grooves 131, 132, and 133 are respectively formed in the upper frame 120 and the lower frame 130 that define the appearances of the upper surface and the lower surface of the frame 110. The first to third upper fixing grooves 121, 122, and 123 are respectively located at a front end, a rear end, and an intermediate portion of the upper frame 120 defining the appearance of the upper surface of the frame 110, and the first to third lower fixing grooves 131, 132, and 133 are respectively located at a front end, a rear end, and an intermediate portion of the lower frame 130 defining the appearance of the lower surface of the frame 110. An upper end and a lower end of the functional member 150 are respectively inserted into and fixed by the first upper fixing groove 121 and the first lower fixing groove 131, an upper end and a lower end of the insulation member 160 are respectively inserted into and fixed by the second upper fixing groove 122 and the second lower fixing groove 132, and an upper end and a lower end of the blocking member 170 are respectively inserted into and fixed by the third upper fixing groove 123 and the third lower fixing groove 133.

In the embodiment, the first upper fixing groove 121 and the first lower fixing groove 131 and the second upper fixing groove 122 and the second lower fixing groove 132 are arranged at directly upper and lower sides in a vertical direction, respectively. However, the third upper fixing groove 123 and the third lower fixing groove 133 are arranged to be spaced apart from each other in the vertical direction. The spaced arrangement of the third upper fixing groove 123 and the third lower fixing groove 133 is to arrange the blocking member 170 at an inclination, which will be described below, and the third upper fixing groove 123 is arranged at a front location with respect to the third lower fixing groove 133. In addition, the outlet 113 is arranged between the first and third upper fixing grooves 121 and 123, and the inlet 111 is arranged between the first and second lower fixing grooves 131 and 133.

Next, an upper end and a lower end of the functional member 150 are respectively inserted into and fixed by the first upper fixing groove 121 and the first lower fixing groove 131. Therefore, the functional member 150 is exposed to the outside space via the open front surface of the frame 110. A solar panel for solar power generation or an exterior material for finishing of the building may be used as the functional member 150.

The insulation member 160 blocks heat transfer moving between the inside space and the outside space of the building via the outer wall W. In the embodiment, as an upper end and a lower end of the insulation member 160 are respectively inserted into and fixed by the second upper fixing groove 122 and the second lower fixing groove 132, the insulation member 160 is arranged in rear of the functional member 150.

The blocking member 170 blocks contact between air flowing inside the insulation member 160 and air flowing inside the flow path 100P. As the upper end and the lower end of the blocking member 170 are respectively inserted into the third upper fixing groove 123 and the third lower fixing groove 133, the blocking member 170 is fixed in an inside portion of the frame 110 corresponding to a portion between the functional member 150 and the insulation member 160.

Meanwhile, as the third upper fixing groove 123 is arranged at a front location with respect to the third lower fixing groove 133, actually, the blocking member 170 is arranged such that the upper end is inclined more forward than the lower end. However, since the flow path 100P is defined between the rear surface of the functional member 150 and the front surface of the blocking member 170, in the embodiment, the flow path 100P is formed to be inclined such that a flow sectional area of the flow path 100P is reduced from the inlet 111 toward the outlet 113. Therefore, in the embodiment, the velocity of flow of the air flowing inside the flow path 100P increases gradually, and thus the air can be efficiently discharged to the outside space of the frame 110.

Next, each of the horizontal insulation units 200 is formed into a horizontally long shape and blocks heat transfer moving via a gap between the vertically adjacent insulation-integrated units 100, and includes a plurality of horizontal insulation units 200 spaced apart from each other in the vertical direction. An upper end of a lower insulation-integrated unit and a lower end of an upper insulation-integrated unit of the two vertically adjacent insulation-integrated units 100 are supported by each of the horizontal insulation units 200. In the embodiment, each of the horizontal insulation units 200 includes a horizontal frame 210 and a horizontal insulation member 220.

The horizontal frame 210, for example, may be formed into a long hollow shape arranged in a horizontal direction. A structure for fixation to the vertical insulation unit 300 and a structure for supporting of the insulation-integrated unit 100 are provided in the horizontal frame 210.

First, first and second fastening flanges 211 and 212 are provided at the horizontal frame 210 for fixation to the vertical insulation unit 300. The first fastening flange 211 is extended downward from a rear end of a lower surface of the horizontal frame 210, and a fastener fastened to the vertical insulation unit 300 penetrates through the first fastening flange 211. In addition, the second fastening flange 212 is extended upward from a rear end of an upper surface of the horizontal frame 210, and a fastener fastened to the vertical insulation unit 300 penetrates through the second fastening flange 212.

Furthermore, the horizontal frame 210 includes a first locking protrusion 213 to which the upper end of the lower insulation-integrated unit 100 of the two vertically adjacent insulation-integrated units 100 is engaged and supported. The first locking protrusion 213 is inserted into the first locking hook 115 of the lower insulation-integrated unit 100 of the two vertically adjacent insulation-integrated units 100.

In the embodiment, the first locking protrusion 213 includes a horizontal extension part 213A and a vertical extension part 213B. The horizontal extension part 213A is extended forward from a lower end of the first fastening flange 211, and the vertical extension part 213B is extended upward from a front end of the horizontal extension part 213A. Therefore, a first locking groove 215 is defined by the lower surface of the horizontal frame 210, a front surface of the first fastening flange 211, and upper and rear surfaces of the first locking protrusion 213, and the upper end of the lower insulation-integrated unit 100 of the two vertically adjacent insulation-integrated units 100 is hooked into the first locking groove 215.

In addition, the horizontal frame 210 includes a second locking protrusion 214, and the lower end of the upper insulation-integrated unit 100 of the two vertically adjacent insulation-integrated units 100 is engaged with and supported by the second locking protrusion 214. The second locking protrusion 214 is inserted into the second locking hook 117 of the upper insulation-integrated unit 100 of the two vertically adjacent insulation-integrated units 100.

The second locking protrusion 214 is extended upward from a front end of the upper surface of the horizontal frame 210. Therefore, a second locking groove 216 is defined by the upper surface of the horizontal frame 210, a front surface of the second fastening flange 212, and a rear surface of the second locking protrusion 214, and the lower end of the upper insulation-integrated unit 100 of the two vertically adjacent insulation-integrated unit 100 is hooked into second locking groove 216.

Specifically, in the embodiment, the first and second fastening flanges 211 and 212 are extended relatively upward and downward more than the first and second locking protrusions 213 and 214. Therefore, at least a part of the first fastening flange 211 and a part of the second fastening flange 212 are exposed forward, and thus an operation in which the horizontal frame 210 is fixed to the vertical insulation unit 300 may be efficiently performed.

Furthermore, as the first and second fastening flanges 211 and 212 are extended relatively upward and downward more than the first and second locking protrusions 213 and 214, the first locking groove 215 is open forward, and the second locking groove 216 is open upward and forward. Therefore, in the embodiment, as the insulation-integrated unit 100 moves in the front to rear direction, the first and second locking hooks 115 and 117 are inserted into the first and second locking grooves 215 and 216. When the insulation-integrated unit 100 moves in the top to down direction, as the first and second locking hooks 115 and 117 are respectively hooked into the first locking groove 215 of an upper horizontal insulation unit 200 and the second locking groove 216 of a lower horizontal insulation unit 200 of the two vertically adjacent horizontal insulation units 200, the insulation-integrated unit 100 is hooked by the horizontal insulation units 200.

A gasket insertion groove 215 is formed on a front surface of the horizontal frame 210. A gasket G is fixed in the gasket insertion groove 215, and the gasket G support a rear surface of the insulation-integrated unit 100, that is, the rear surface of the frame 110 elastically.

Meanwhile, the horizontal insulation member 220 is provided inside the horizontal frame 210. The horizontal insulation member 220 blocks heat transfer moving via a gap between the vertical adjacent insulation-integrated units 100. A vacuum insulation material with high thermal insulation property may be used as the horizontal insulation member 220.

Next, each of the vertical insulation units 300 is formed into a vertically long shape, and blocks heat transfer moving via a gap between horizontally adjacent insulation-integrated units 100, and is fixed to the outer wall W so as to be spaced apart from each other in the horizontal direction. The horizontal insulation units 200 are fixed to the vertical insulation units 300.

The vertical insulation unit 300 includes a hollow vertical frame 310 and a vertical insulation member 320 provided inside the vertical frame 310. The vertical frame 310 is arranged in a vertically long shape, and is fixed to the outer wall W by a separate fixation member. For example, a T-shaped bar B2 is fixed to a L-shaped bar B1 fixed to the outer wall W, and the vertical frame 310 may be fixed to the T-shaped bar B2. Furthermore, as described above, the horizontal insulation units 200, i.e., the horizontal frame 210 is fixed to the vertical frame 310 by a fastener. The vertical insulation member 320 blocks heat transfer moving via the gap between the horizontally adjacent insulation-integrated units 100 and is almost identical to the horizontal insulation member 220.

In the embodiment with the above-described structure, the insulation-integrated units 100 serve an additional function of the functional member 150 in addition to the insulation function of the insulation member 160. Therefore, in the embodiment, the construction on site for ensuring the insulation and additional functions can be minimized.

Furthermore, in the embodiment, the insulation-integrated units 100, i.e., the functional member 150, is cooled by the air introduced into the inside space and discharged to the outside space of the frame 110 and flowing along the flow path 100P. Therefore, in the embodiment, for example, when a solar panel is used as the functional member 150, the cooling can be expected.

Specifically, as the flow sectional area of the flow path 100P is reduced from the inlet 111 toward the outlet 113, the discharge of air to the outside of the frame 110 is efficiently performed and, eventually, the functional member 150 is efficiently cooled. Furthermore, as the blocking member 170 blocks the insulation member 160 from being in contact with the air flowing along the flow path 100P, it is possible to prevent the insulation member 160 from being damaged due to transfer of moisture in the air, etc.

Moreover, in the embodiment, the horizontal insulation units 200 and the vertical insulation unit 300 block heat transfer moving via the gaps between the insulation-integrated units 100 arranged to be spaced apart from each other in the vertical and horizontal directions. Therefore, according to the embodiment, a problem caused by the construction of a plurality of insulation members 160 actually united, i.e., the deterioration of thermal insulation performance due to a gap between the insulation members (160) can be prevented.

Within the scope and spirit of the present disclosure as described above, those skilled in the art will appreciate that various modifications, additions and substitutions are possible, and the scope of the present disclosure should be interpreted based on the accompanying claims.

What is claimed is:

1. An exterior building structure using a unit integrated with insulation, the exterior building structure (1) fixing an insulation-integrated unit (100) to an outer wall (W) of a building, the exterior building structure (1) comprising:
    a plurality of the insulation-integrated units (100) each comprising a frame (110), a functional member (150) fixed to the frame (110), and an insulation member (160), the plurality of insulation-integrated units (100) being sequentially arranged vertically and horizontally; and
    a plurality of horizontal insulation units (200) each comprising a hollow horizontal frame (210) and a horizontal insulation member (220) provided inside the horizontal frame (210), formed into a horizontally long shape to block heat transfer moving via a gap between the insulation-integrated units (100) that are vertically adjacent to each other, and supporting an upper end of a lower insulation-integrated unit and a lower end of an upper insulation-integrated unit of the two vertically adjacent insulation-integrated units while being fixed directly to the outer wall (W) to be vertically spaced apart from another horizontal insulation unit.

2. The exterior building structure of claim 1, wherein the functional member (150) is fixed to a front end of the frame (110) and is exposed to an outside space, and
    the insulation member (160) is fixed to a rear end of the frame (110) and is spaced apart from the functional member (150) front and rear.

3. The exterior building structure of claim 2, wherein an inlet (111) and an outlet (113) are respectively formed on a lower surface and an upper surface of the frame (110) so that air is introduced into an inside space and discharged to an outside space of the frame (110) via the inlet (111) and the outlet (113), and
    a flow path (100P) is defined inside the frame (110), and the air introduced into the inside space and discharged to the outside space of the frame (110) via the inlet (111) and the outlet (113) flows along the flow path (100P).

4. The exterior building structure of claim 3, wherein each of the insulation-integrated units (100) further comprises a blocking member (170) fixed to an inside portion of the frame (110), the inside portion corresponding to a gap between the functional member (150) and the insulation member (160), and the blocking member (170) blocks the insulation member (160) from being in contact with the air flowing along the flow path (100P).

5. The exterior building structure of claim 4, wherein the flow path (100P) is defined between a rear surface of the functional member (150) and a front surface of the blocking member (170), and
    the blocking member (170) is arranged such that a flow sectional area of the flow path (100P) is reduced from the inlet (111) toward the outlet (113).

6. The exterior building structure of claim 2, wherein the frame (110) comprises:
    an upper frame (120) defining appearances of an upper surface and a part of an upper portion of a rear surface of the frame (110), and supporting an upper end of the functional member (150) and an upper end of the insulation member (160);
    a lower frame (130) defining appearances of a lower surface and a part of a lower portion of the rear surface of the frame (110), and supporting a lower end of the functional member (150) and a lower end of the insulation member (160); and
    an intermediate frame (140) defining a remaining appearance of the rear surface of the frame (110), and connecting the upper frame (120) to the lower frame (130),
    wherein a height of the frame (110) is variable in response to a height of the intermediate frame (140).

7. The exterior building structure of claim 1, wherein the frame (110) comprises:
    a first locking hook (115) arranged at an upper portion of a rear surface of the frame (110), and open downward; and
    a second locking hook (117) arranged at a lower portion of the rear surface of the frame (110), and open downward, and
    the horizontal frame (210) comprises:
    a first locking groove (215) provided at a lower portion of the horizontal frame (210) and open forward, and into which the first locking hook (115) of the lower insulation-integrated unit of the two vertically adjacent insulation-integrated units (100) is hooked; and
    a second locking groove (216) provided at an upper portion of the horizontal frame (210) and open toward at least an upper space, and into which the second locking hook (117) of the upper insulation-integrated unit of the two vertically adjacent insulation-integrated units (100) is hooked,
    wherein each of the insulation-integrated unit (100) moves in a front to rear direction so that the first locking hook (115) is inserted into the first locking groove (215) and simultaneously the second locking hook (117) is located directly above the second locking groove (216), and then the insulation-integrated unit (100) moves in a top to down direction so that the first and second locking hooks (115 and 117) are respectively hooked into the first locking groove (215) of an upper horizontal insulation unit (200) and the second locking groove (216) of a lower horizontal insulation unit (200) of two vertically adjacent horizontal insulation units (200) of the horizontal insulation units (200).

8. An exterior building structure using a unit integrated with insulation, the exterior building structure (1) fixing an insulation-integrated unit (100) to an outer wall (W) of a building, the exterior building structure (1) comprising:
    a plurality of the insulation-integrated units (100) each comprising a frame (110), a functional member (150) fixed to the frame (110), and an insulation member (160), the plurality of insulation-integrated units (100) being sequentially arranged vertically and horizontally;
    a plurality of horizontal insulation units (200) each comprising a hollow horizontal frame (210) and a horizontal insulation member (220) provided inside the horizontal frame (210), formed into a horizontally long shape to block heat transfer through a gap between the insulation-integrated units (100) that are vertically adjacent to each other, and supporting an upper end of a lower insulation-integrated unit and a lower end of an upper insulation-integrated unit of two vertically adjacent insulation-integrated units of the insulation-integrated units (100) while being fixed directly to the outer wall (W) to be vertically spaced apart from another horizontal insulation unit; and a plurality of vertical insulation units (300) each comprising a hollow vertical frame (310) and a vertical insulation member (320) provided inside the vertical frame (310), formed into a vertically long shape to block heat transfer moving via a gap between the insulation-integrated units (100) that are horizontally adjacent to each other, and fixing the horizontal insulation units (200) while being fixed to the outer wall (W) to be horizontally spaced apart from another vertical insulation unit.

9. The exterior building structure of claim 8, wherein the functional member (150) is fixed to a front end of the frame (110) and is exposed to an outside space, and the insulation member (160) is fixed to a rear end of the frame (110) and is spaced apart from the functional member (150) front and rear.

10. The exterior building structure of claim 9, wherein an inlet (111) and an outlet (113) are respectively formed on a lower surface and an upper surface of the frame (110) so that air is introduced into an inside space and discharged to an outside space of the frame (110) via the inlet (111) and the outlet (113), and a flow path (100P) is defined inside the frame (110), and the air introduced into the inside space and discharged to the outside space of the frame (110) via the inlet (111) and the outlet (113) flows along the flow path (100P).

11. The exterior building structure of claim 10, wherein each of the insulation-integrated units (100) further comprises a blocking member (170) fixed to an inside portion of the frame (110), the inside portion corresponding to a gap between the functional member (150) and the insulation member (160), and the blocking member (170) blocks the insulation member (160) from being in contact with the air flowing along the flow path (100P).

12. The exterior building structure of claim 11, wherein the flow path (100P) is defined between a rear surface of the functional member (150) and a front surface of the blocking member (170), and the blocking member (170) is arranged such that a flow sectional area of the flow path (100P) is reduced from the inlet (111) toward the outlet (113).

13. The exterior building structure of claim 9, wherein the frame (110) comprises:

an upper frame (120) defining appearances of an upper surface and a part of an upper portion of a rear surface of the frame (110), and supporting an upper end of the functional member (150) and an upper end of the insulation member (160);

a lower frame (130) defining appearances of a lower surface and a part of a lower portion of the rear surface of the frame (110), and supporting a lower end of the functional member (150) and a lower end of the insulation member (160); and an intermediate frame (140) defining a remaining appearance of the rear surface of the frame (110), and connecting the upper frame (120) to the lower frame (130), wherein a height of the frame (110) is variable in response to a height of the intermediate frame (140).

14. The exterior building structure of claim 8, wherein the frame (110) comprises:

a first locking hook (115) arranged at an upper portion of a rear surface of the frame (110), and open downward; and a second locking hook (117) arranged at a lower portion of the rear surface of the frame (110), and open downward, and the horizontal frame (210) comprises:

a first locking groove (215) provided at a lower portion of the horizontal frame (210) and open forward, and into which the first locking hook (115) of the lower insulation-integrated unit of the two vertically adjacent insulation-integrated units (100) is hooked; and a second locking groove (216) provided at an upper portion of the horizontal frame (210) and open toward at least an upper space, and into which the second locking hook (117) of the upper insulation-integrated unit of the two vertically adjacent insulation-integrated units (100) is hooked, wherein each of the insulation-integrated unit (100) moves in a front to rear direction so that the first locking hook (115) is inserted into the first locking groove (215) and simultaneously the second locking hook (117) is located directly above the second locking groove (216), and then the insulation-integrated unit (100) moves in a top to down direction so that the first and second locking hooks (115 and 117) are respectively hooked into the first locking groove (215) of an upper horizontal insulation unit (200) and the second locking groove (216) of a lower horizontal insulation unit (200) of two vertically adjacent horizontal insulation units (200) of the horizontal insulation units (200).

15. The exterior building structure of claim 8, the horizontal frame (210) comprises:

a first fastening flange (211) extended downward from a rear end of a lower surface of the horizontal frame (210) and through which a fastener fastened to the vertical frame (310) penetrates;

a second fastening flange (212) extended upward from a rear end of an upper surface of the horizontal frame (210) and through which a fastener fastened to the vertical frame (310) penetrates;

a first locking protrusion (213) comprising a horizontal extension part (213A) extended forward from a lower end of the first fastening flange (211) and a vertical extension part (213B) extended upward from a front end of the horizontal extension part (213A), and with which the upper end of the lower insulation-integrated unit of the two vertically adjacent insulation-integrated units (100) is engaged; and a second locking protrusion (214) extended upward from a front end of an upper surface of the horizontal frame (210) and with which the lower end of the upper insulation-integrated unit of the two vertically adjacent insulation-integrated units (100) is engaged.

16. The exterior building structure of claim 15, wherein a first locking groove (215), into which the upper end of the lower insulation-integrated unit (100) of the two vertically adjacent insulation-integrated units (100) is hooked, is defined by a lower surface of the horizontal frame (210), a front surface of the first fastening flange (211), and an upper surface and a rear surface of the first locking protrusion (213), and a second locking groove (216), into which the lower end of the upper insulation-integrated unit (100) of the two vertically adjacent insulation-integrated units (100) is hooked, is defined by an upper surface of the horizontal frame (210), a front surface of the second fastening flange (212), and a rear surface of the second locking protrusion (214).

17. The exterior building structure of claim 16, wherein at least a part of the first fastening flange (211) and a part of the second fastening flange (212) are exposed forward.

\* \* \* \* \*